US012605816B2

(12) United States Patent
Versino et al.

(10) Patent No.: US 12,605,816 B2
(45) Date of Patent: Apr. 21, 2026

(54) FASTENER DRIVING TOOL INCLUDING A NOSEPIECE ASSEMBLY AND A NOSE POSITIONER

(71) Applicant: Illinois Tool Works Inc., Glenview, IL (US)

(72) Inventors: Anthony M. Versino, Charlotte, NC (US); Daniel Pinkerton, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 19/214,839

(22) Filed: May 21, 2025

(65) Prior Publication Data

US 2025/0367801 A1 Dec. 4, 2025

Related U.S. Application Data

(60) Provisional application No. 63/655,842, filed on Jun. 4, 2024.

(51) Int. Cl.
*B25C 1/00* (2006.01)

(52) U.S. Cl.
CPC .................................... *B25C 1/008* (2013.01)

(58) Field of Classification Search
CPC ...................................................... B25C 1/008
USPC .......................................................... 227/119
See application file for complete search history.

(56) References Cited

U.S. PATENT DOCUMENTS

| | | | | |
|---|---|---|---|---|
| 5,452,835 | A | 9/1995 | Shkolnikov | |
| 6,789,718 | B2 * | 9/2004 | Canlas | B25C 7/00 227/107 |
| 8,056,785 | B2 | 11/2011 | Gosis et al. | |
| 8,235,270 | B2 | 8/2012 | Gosis et al. | |
| 11,020,843 | B2 | 6/2021 | Young et al. | |
| 11,897,103 | B2 * | 2/2024 | Tse | B25C 1/001 |
| 2007/0215668 | A1 * | 9/2007 | Tabacco | B25C 7/00 227/107 |
| 2022/0178147 | A1 * | 6/2022 | Schuss, Jr. | B25C 7/00 |

OTHER PUBLICATIONS

Extended European Search Report from European Application No. 25179949.0, dated Oct. 24, 2025 (9 pages).

* cited by examiner

*Primary Examiner* — Michelle Lopez
(74) *Attorney, Agent, or Firm* — Neal, Gerber & Eisenberg LLP

(57) ABSTRACT

A fastener driving tool including a nose positioner that enables an operator of the tool to consistently and repeatedly accurately position the tool in desired positions relative to an edge of a workpiece and to hold the tool in each of such desired positions prior to and during the firing processes. In various embodiments, the nose positioner is removably attachable to a barrel of the fastener driving tool. Various embodiments relate to the nose positioner itself and thus provide a nose positioner for a fastener driving tool.

18 Claims, 7 Drawing Sheets

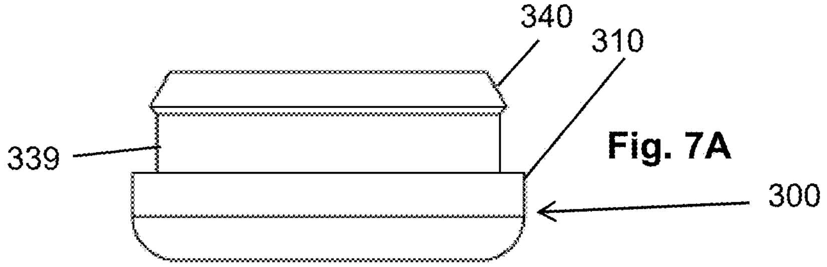
Fig. 7A
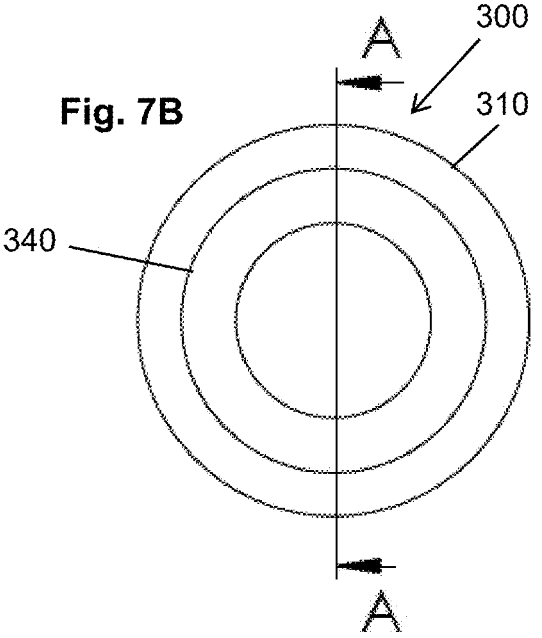
Fig. 7B
Fig. 7C
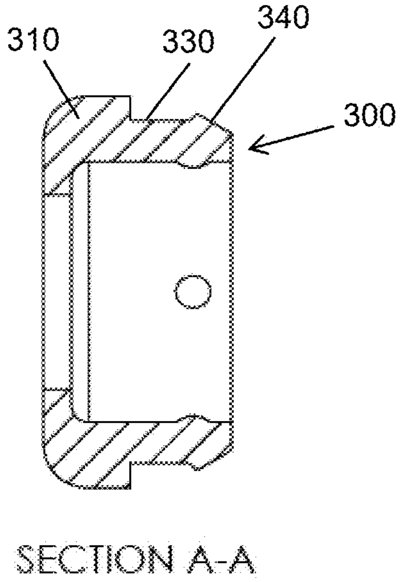
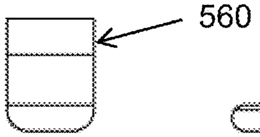
Fig. 7D
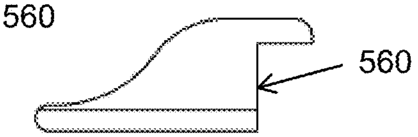
Fig. 7E
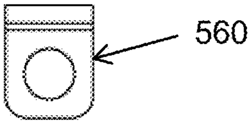
Fig. 7F
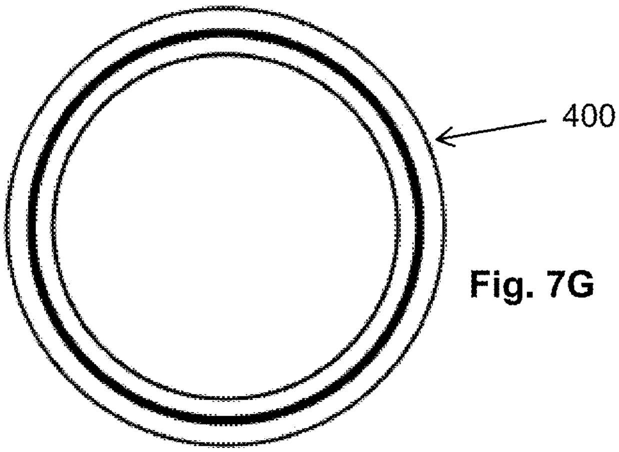
Fig. 7G

FASTENER DRIVING TOOL INCLUDING A NOSEPIECE ASSEMBLY AND A NOSE POSITIONER

PRIORITY CLAIM

The patent application claims priority to and the benefit of U.S. Provisional Patent Application No. 63/655,842, filed Jun. 4, 2024, the entire contents of which are incorporated herein by reference.

BACKGROUND

The present disclosure relates to powered fastener driving tools. Powered fastener driving tools employ one of several different types of power sources to drive a fastener (such as a nail) into a workpiece and into an underlying member (such as to attach the workpiece to the underlying member).

Various known powered fastener driving tools use a power source to drive a piston and/or an attached driver blade of the tool from a pre-firing position to a firing position. As the piston moves toward the firing position, the driver blade travels through a nosepiece assembly of the tool into contact with a fastener temporarily positioned in the nosepiece assembly. Continued movement of the piston to the firing position causes the driver blade to drive the fastener from the nosepiece assembly into the workpiece and the underlying member. The piston is then moved back to the pre-firing position in a way that depends on the tool's configuration and power source. A fastener-advancing device of the tool moves another fastener from a magazine of the tool into the nosepiece assembly such that the tool is ready to drive this next fastener.

In various such tools, when an operator engages a workpiece contact element ("WCE") of the nosepiece assembly against the workpiece, the WCE moves from an extended position to a retracted position. Thereafter, responsive to the operator depressing the trigger of the tool, the piston moves from the pre-firing position to the firing position, thereby causing the driver blade to contact a fastener positioned in the nosepiece assembly and to drive the fastener from the nosepiece assembly into the workpiece and the underlying member (as described above). When the operator removes the WCE from engagement with the workpiece, the WCE moves from the retracted position back to the extended position.

Various known fastener driving tools include a WCE that includes a barrel that functions to guide the fasteners. These barrels can sometimes move relative to the workpiece after the operator positions the tool during the process of positioning the barrel at the desired location on the workpiece or during the fastener driving process.

Additionally, for certain uses, the desired positions of the fasteners relative to the workpiece are static distances from an edge of the workpiece (such as positioning each fastener one inch from the top edge of the workpiece).

There is a need for a fastener driving tool that minimizes improper placements of the fasteners relative to the workpieces and that assist the operator in correctly positioning the fastener driving tool including the barrel of the WCE of the nose assembly thereof.

SUMMARY

Various embodiments of the present disclosure provide a fastener driving tool including a nosepiece assembly and nose positioner attachable to the nosepiece assembly and that enables an operator of the tool to consistently and repeatedly accurately position the tool in desired positions relative to an edge of a workpiece and to hold the tool in each of such desired positions prior to and during the firing processes. In various embodiments, the nose positioner is removably attachable to a barrel of a WCE of the nosepiece assembly of the fastener driving tool. Various embodiments of the present disclosure relate to the nose positioner itself and thus provide a nose positioner for a fastener driving tool.

Additional features and advantages are described in, and will be apparent from, the following Detailed Description and the Figures.

BRIEF DESCRIPTION OF THE DRAWINGS

FIG. 7A is an enlarged top view of the barrel connector of the nose positioner of FIG. 1.

FIG. 7B is an enlarged front view of the barrel connector of the nose positioner of FIG. 1.

FIG. 7C is an enlarged cross-sectional view of the barrel connector of the nose positioner of FIG. 1.

FIG. 7D is an enlarged front view of the probe of the nose positioner of FIG. 1.

FIG. 7E is an enlarged side view of the probe of the nose positioner of FIG. 1.

FIG. 7F is an enlarged rear view of the probe of the nose positioner of FIG. 1.

FIG. 7G is an enlarged front view of the rotational bearing of the nose positioner of FIG. 1.

DETAILED DESCRIPTION

Figure 1:
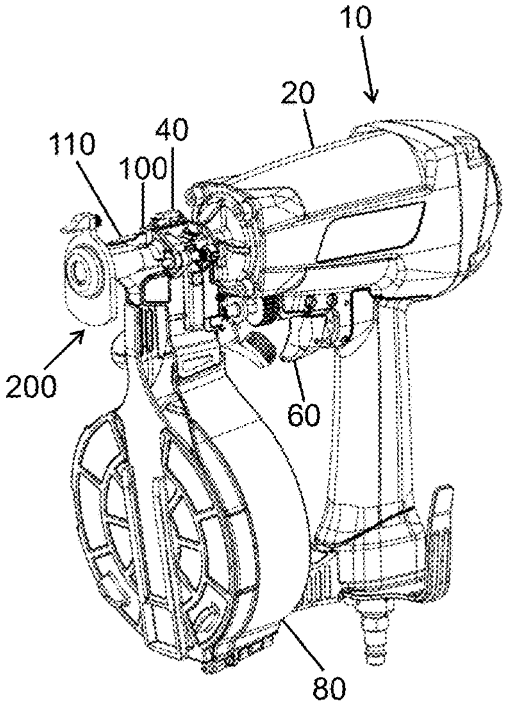
FIG. 1 is a front perspective view of a combustion powered fastener driving tool with a nosepiece assembly having a WCE including a barrel, and of a nose positioner attached to the barrel in accordance with one example embodiment of the present disclosure.

While the systems, devices, and methods described herein may be embodied in various forms, the drawings show, and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Figure 2:
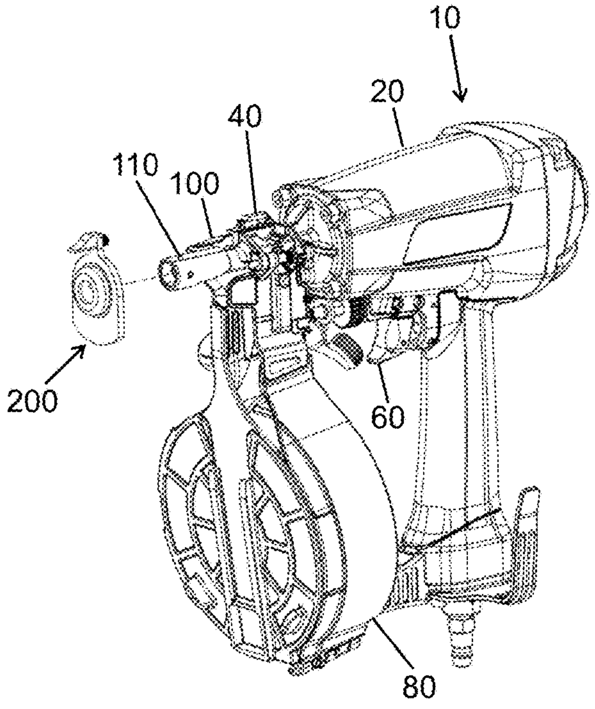
FIG. 2 is an exploded perspective front view of the fastener driving tool and the nose positioner of FIG. 1, showing the nose positioner detached from the barrel of the WCE of the nosepiece assembly of the fastener driving tool.
Figure 3:
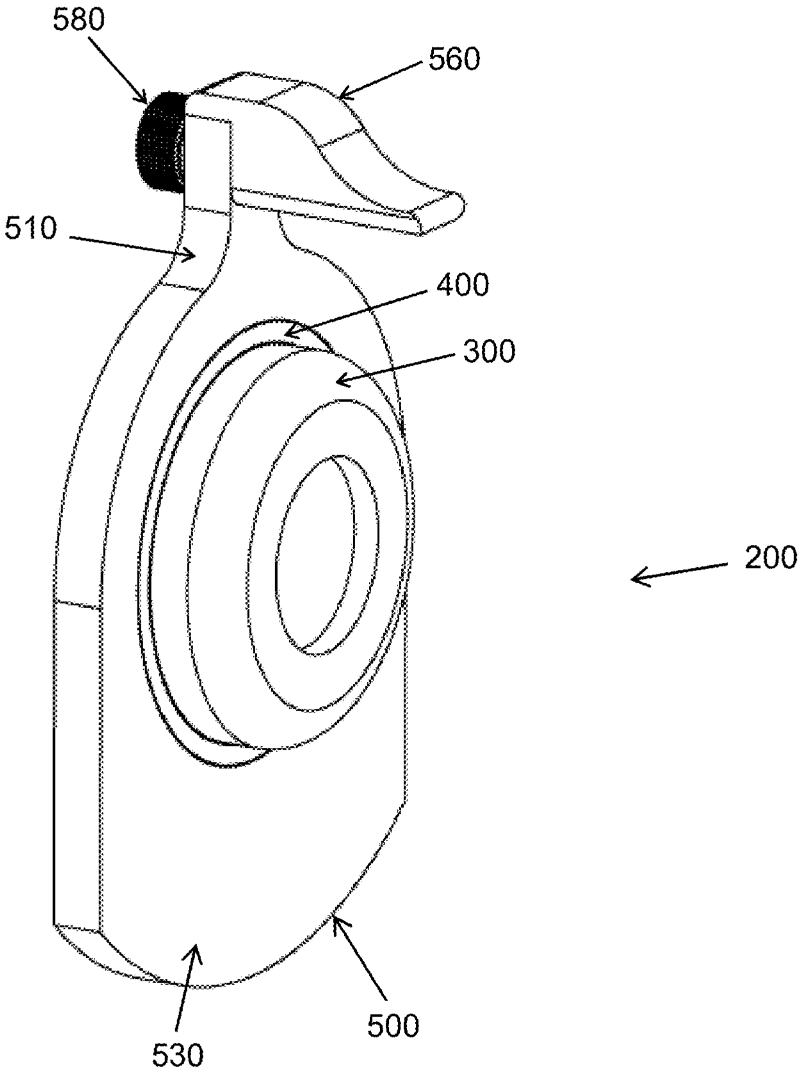
FIG. 3 is an enlarged front perspective view of the nose positioner of FIG. 1.
Figure 4:
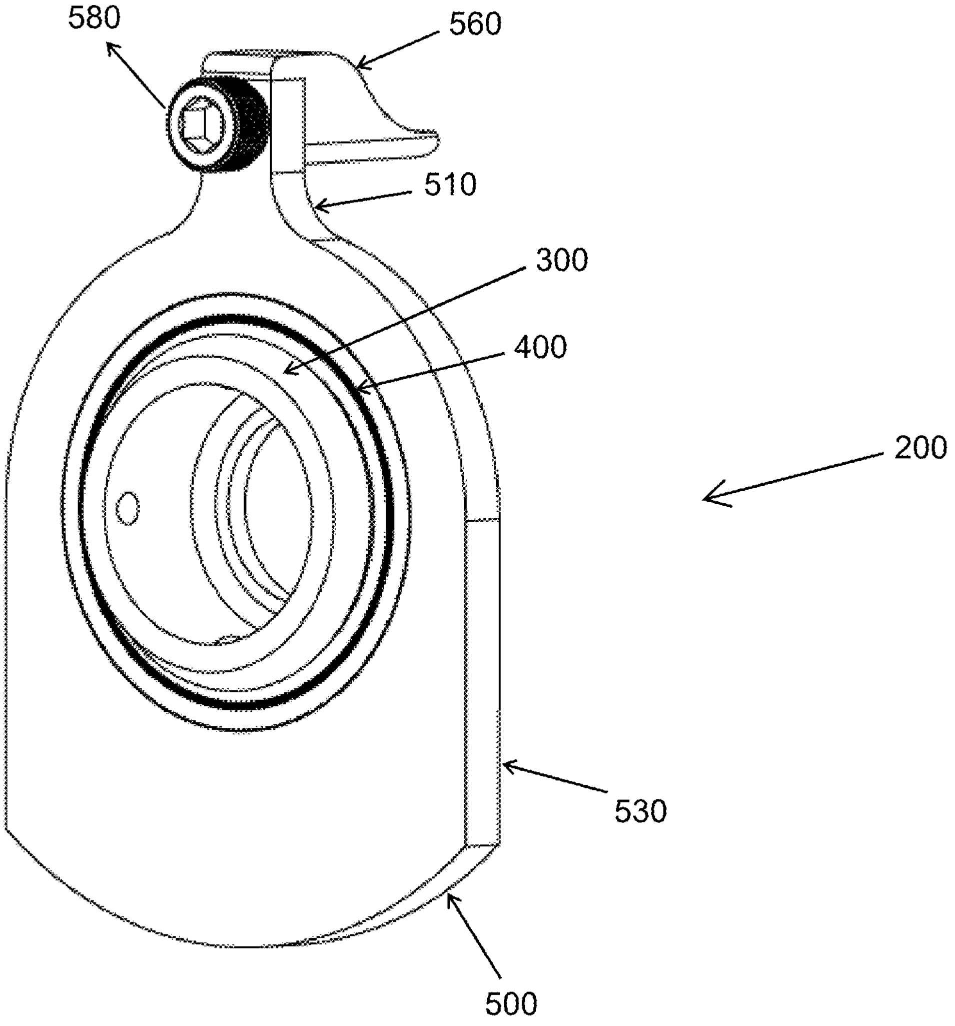
FIG. 4 is an enlarged rear perspective view of the nose positioner of FIG. 1.
Figure 5:
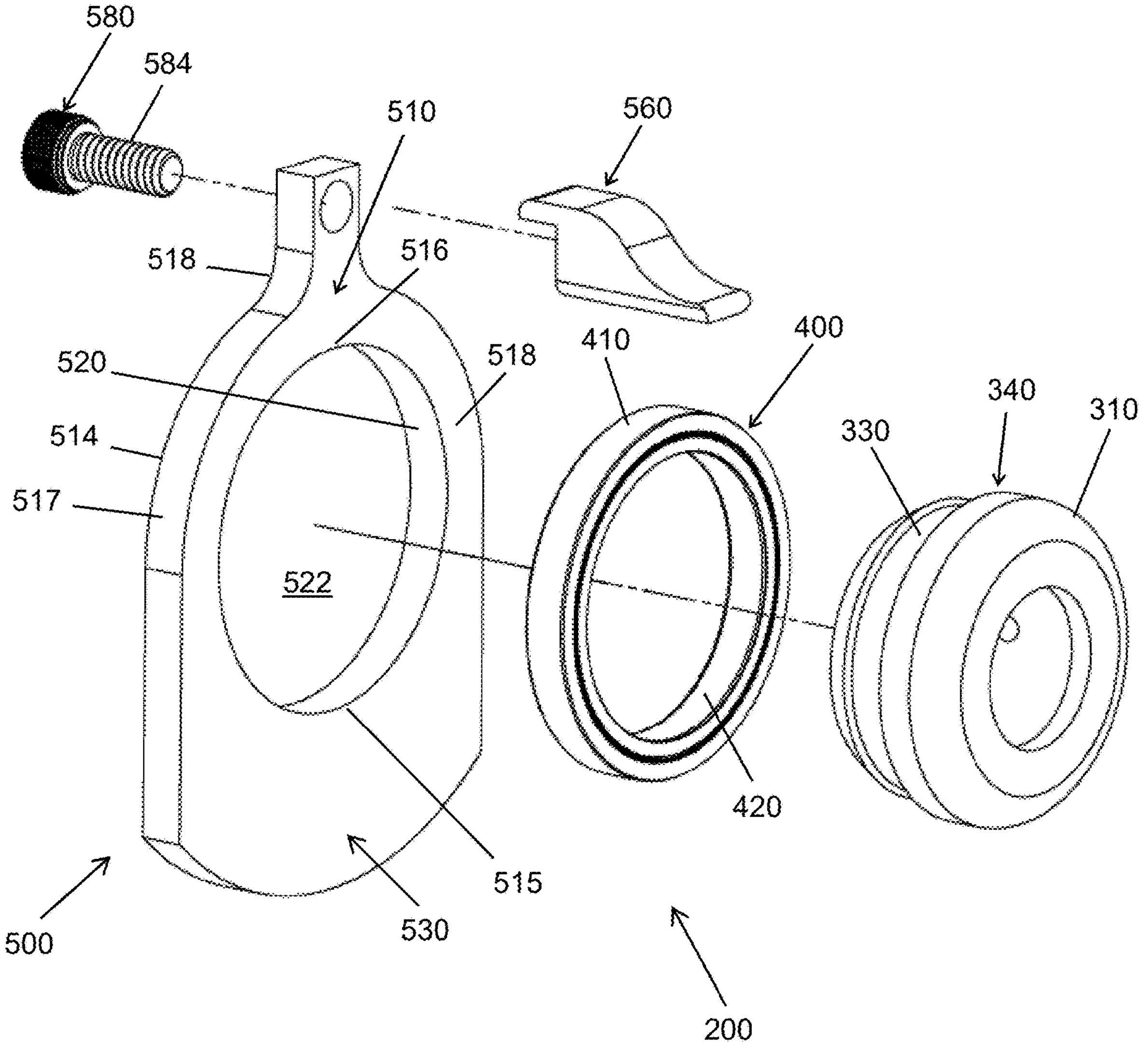
FIG. 5 is an enlarged exploded front perspective view of the nose positioner of FIG. 1.
Figure 6:
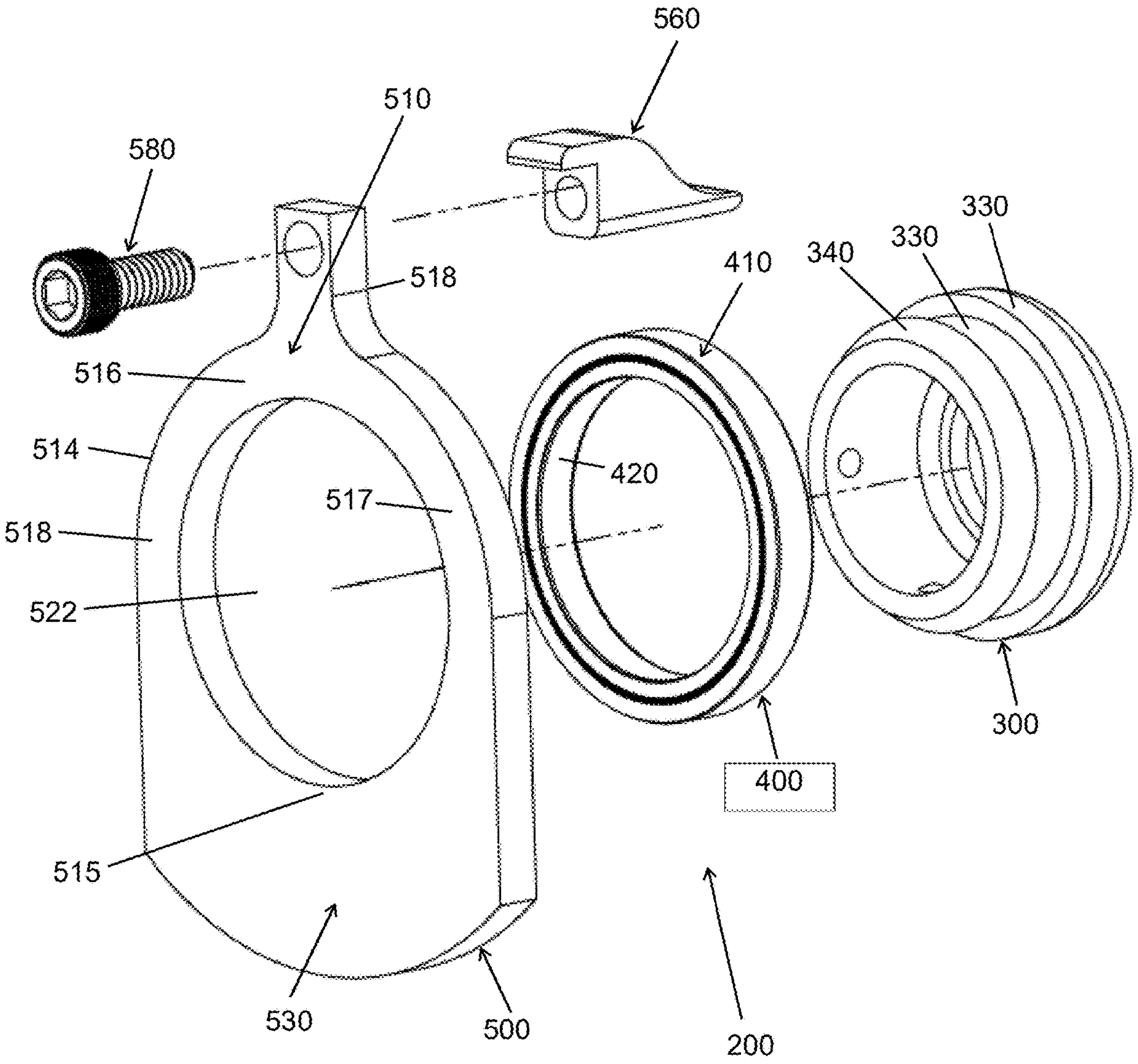
FIG. 6 is an enlarged rear exploded perspective view of the nose positioner of FIG. 1.

FIGS. 1 and 2 illustrate an example fastener driving tool 10 of one example embodiment of the present disclosure (which is sometimes called the "tool" for brevity herein). In this example embodiment, the tool 10 is a pneumatically powered fastener driving tool, but it should be appreciated that the tool can be a different type of fastener driving tool. In other words, the pneumatically powered fastener driving tool is used as the primary example herein for explaining the present disclosure, but it should be appreciated that the present disclosure is not limited to such pneumatically powered fastener driving tools, and that the fastener driving tools of the present disclosure can be other types of fastener driving tools such as but not limited to combustion powered fastener driving tools or electrically powered fastener driving tools (such as electric battery powered fastener driving tools).

The fastener driving tool 10 generally includes a multi-piece housing 20, a power assembly (not shown) at least partially within the housing 20, a nosepiece assembly 40 connected to and supported by the housing 20, a trigger assembly 60 connected to and supported by the housing 20, and a fastener magazine 80 connected to and supported by the nosepiece assembly 40 and the housing 20. The nosepiece assembly 40 includes a WCE 100 including a barrel 110. The barrel 110 defines an internal fastener path (not shown) that has a central axis. The tool 10 is configured to drive each fastener through the barrel 110 along the path and thus along the central axis. A nose positioner 200 is removably attachable to the barrel 110 of the WCE 100 in accordance with this illustrated example embodiment of the present disclosure. FIG. 1 shows the nose positioner 200 attached to the barrel 110 of the WCE 100. FIG. 2 shows the nose positioner 200 detached from the barrel 110 of the WCE 100.

Since various components of the fastener driving tool 10 such as the housing 20, the power assembly, the trigger assembly 60, the nosepiece assembly 40, the WCE 100, and the fastener magazine 80 are well-known in the industry, they are not described herein in detail for brevity.

In this illustrated example embodiment, the nose positioner 200 includes: (1) a barrel connector 300; (2) a rotational bearing 400 connected to and supported by the barrel connector 300; (3) a probe supporter 500 connected to and supported by the rotational bearing 400; and (4) a probe 560 connected to and supported by the probe supporter 500. The barrel connector 300 is configured to be removably attached to the barrel 110 of the WCE 100 of the tool 10. The rotational bearing 400 functions as rotational component and is configured to enable the probe supporter 500 to freely rotate about the barrel connector 300 and thus the barrel 110 of the tool 10 when the nose positioner 200 is connected to the barrel 110. As further described below, the probe supporter 500 is proportionally weighted such that the probe supporter 500 is self positioning and configured to position the probe 560 for engagement with a top edge of the workpiece to assist in positioning the tool 10 in each desired position relative to the workpiece (not shown) such as described below.

More specifically, the barrel connector 300 is configured to be removably attached to the barrel 110 of the WCE 100 of the tool 10. The barrel connector 300 thus removably attaches the nose positioner 200 to the WCE 100 of the tool 10. The barrel connector 300 also functions as a WCE connector and as a nosepiece assembly connector.

The barrel connector 300 includes a cylindrical outer member 310 connected to a cylindrical inner member 340. The inner member 340 is configured to be secured directly to the barrel 110 via a friction fit or snap fit. The inner member 340 can alternatively be secured to the barrel 110 via a set screw or another suitable mechanism. The barrel connector 300 has a central axis that is aligned with the central axis of the barrel 110 when the barrel connector 300 is connected to the barrel 110.

The cylindrical outer member 310 and the cylindrical inner member 340 define a recessed area 330 that is configured to receive and facilitates connection to the rotational bearing 400. The barrel connector 300 is configured to be friction fit or snap fit to the rotational bearing 400.

The outer member 310 is configured to engage the workpiece and to prevent damage to the workpiece by the probe supporter 500. The barrel connector 300 is attachable to the barrel 110 such that a central axis of the rotational component 400 is also aligned with the central axis of fastener path of the barrel 110. The barrel connector 300 is attached to the barrel 110 such that the probe 560 of the probe supporter 500 extends beyond the tool 10 such that it can make contact with an upper edge of the workpiece.

In other embodiments, the nose positioner can include a secondary component (not shown) employed to fit around part of the nose piece assembly of the tool to facilitate the connection between the nose positioner and the nose piece assembly. In various such embodiments, this secondary component can function as a protective nose tip to prevent the tool or nose positioner from marking the workpiece.

In the embodiments described herein, the nose positioner 200 is detachable from the fastener driving tool 10. In other embodiments, the nose positioner can be permanently secured to the fastener driving tool such as permanently secured to the nosepiece assembly, the WCE, or the barrel.

The rotational bearing 400 includes a cylindrical outer member 410, a cylindrical rotatable inner member 420, and one or more rotation members (not shown) between the outer member 410 and the inner member 420 that facilitate rotation of the outer member 410 relative to the inner member 420. The rotation member(s) can be ball bearings, bushings, or other suitable devices that facilitate rotation of the outer and inner members 410 and 420 relative to each other.

The inner member 420 of the rotational bearing 400 is configured to be positioned within the recessed area 330 of the barrel connector 300 to create a friction fit or snap fit between the rotational bearing 400 and the barrel connector 300.

As mentioned above, the rotational bearing 400 has a central axis that is aligned with the central axis of the barrel 110 and the central axis of the barrel connector 300 when the barrel connector 300 is connected to the barrel 110.

Thus, in this example embodiments, the rotational bearing 400 enables the probe supporter 500 to freely rotate 360° (with minimal resistance) around its central axis and the central axis of the barrel connector 300, and thus the central axis of the barrel 110.

The rotational bearing 400 can be sealed by an integrated barrier (not shown) or shielded by an additional external housing (not shown) to prevent contamination from impacting rotary motion provided by the rotational bearing.

The probe supporter 500 includes an upper section 510 and a lower section 530. The upper section 510 primarily functions to support the probe 560 and the lower section 530 primarily functions as a counterweight to position the probe 560. The upper section 510 and the lower section 530 can be one piece such as illustrated, or can be multiple attached pieces in accordance with various other embodiments of the present disclosure. The probe supporter 500 and the probe 560 are configured to rotate 360° freely about the central axis of the probe supporter 500. Thus, the probe supporter 500 has a central axis that is aligned with the central axis of the rotational bearing 400, the central axis of the barrel 110, and the central axis of the barrel connector 300 when the barrel connector 300 is connected to the barrel 110.

In this example embodiment, the upper section 510 includes a body 514 and a neck 518 extending from the body 514. The body 514 includes a first (lower) section 515, a second (upper) section 516, a first (right) sight section 517, and a second (left) side section 518. Each of these sections 514, 515, 516, 517 and 518 include connected inner portions that form an inner edge 520 that defines a central bearing receipt opening 522. The inner edge 520 is sized, shaped, and otherwise configured to receive and enable connection of the probe supporter 500 to the rotational bearing 400. Specifically, the outer member 410 of the rotational bearing 400 is suitably attached to the upper section 510 such as by welding or another suitable manner.

In other embodiments, the probe supporter 500 can be split into two sections that are fastened around and secured to the outer surface of the rotational bearing 400.

The upper section 510 supports the probe 560 and a probe connector 580 that is configured to removably connect the probe 560 to the neck 518 of the probe supporter 500. In this illustrated example embodiment, the probe connector 580 includes a head 582 and a threaded shaft 584 connected to an extending from the head 582. The shaft 584 is configured to extend through the opening (not labeled) in the neck 518 and into a threaded inner opening (not labeled) defined by the probe 560.

In this example embodiment, the probe 560 includes a flat bottom contact surface (not labeled) that is configured to contact a top edge or top surface of the workpiece. The probe 560 can be situated so that the probe contact surface can rest on the surface of the top edge of the workpiece, thereby positioning the probe 560, the probe supporter 500, the rotational bearing 400, the barrel connector 300, the barrel 110, the WPE 100, the nose assembly 40, and the tool 10 relative to the workpiece.

The distance between the bottom contact surface of the probe 560 and the central axis of the probe supporter 500 (as well as the central axis of the rotational bearing 400 and the central axis of the barrel connector 300) equals or approximately equals the desired distance from the top edge of the workpiece that the fastener should be placed. Thus, the probe 560 positions the barrel 110 of the tool 10 at the desired distance from this edge of the workpiece.

The configuration of the probe can vary in accordance with the present disclosure. In various embodiments, the probe can have any one of various different shapes (such as being rectangular or cylindrical). In various embodiments, the probe geometry can include round features to enable the tool to move along the top surface of the top edge of the workpiece without catching on material of the workpiece. In various embodiments, the probe can be removably or permanently fixed to the probe supporter. In various embodiments, the probe is a fixed distance from the central axis of the probe supporter. In various other embodiments, the probe can be an adjustable distance from the central axis of the probe supporter. In various embodiments, interchangeable cylindrical probes with differing outer diameters can be employed for providing such adjustable distances. In various embodiments, the probe supporter can include different openings to enable the probe to be closer to or further away from the central axis of the probe supporter. In various embodiments, the probe supporter can be movable (such as slidable) to different positions to enable the probe to be closer to or further away from the central axis of the probe supporter.

In various embodiments, the probe and the probe supporter can be multiple components or a single component. In various embodiments, as an assembly, the probe can be attached to the probe supporter by mechanisms such as a threaded fastener or a snap fit. In various embodiments, as a single body, the probe can be cast with the probe supporter, machined, or permanently press fit or welded together.

The lower section 530 of the probe supporter 500 is positioned radially opposite of the probe 560. The lower section 530 is of a sufficient mass such that it functions as a counterweight to the probe 560.

The balance of mass in the nose positioner 200 and specifically of the probe supporter 500, the probe 560, and the probe connector 580 are configured such that the counterweight (due to gravitational forces) cause the probe supporter 500 to rotate via the rotational bearing 400 and relative to the barrel connector 300 such that regardless of the relative angle of the tool 10 (or the housing of the tool 10), the probe 560 is positioned at an uppermost position and the lower section 530 is positioned at a lowermost position.

The probe 560 is positioned radially opposite the lower section 530 that functions as the counterweight so that gravity automatically rotates the probe 560 to a vertically upward position. In that position, the probe 560 can rest on the top edge of the workpiece and thus function to locate the barrel 510 of the tool 10 at the desired distance from the edge of the workpiece. In other words, the lower section 530 that functions as the counterweight has enough mass relative to the probe 560 and the probe connector 580 that the gravitational force is enough to position the lower section 530 in the radial direction of gravity. The lower section 530 that functions as the counterweight can be formed in any suitable shape where its mass is sufficient to overcome any rotational resistance such as friction from the rotational bearing 400. In various embodiments, the counterweight can part of or can be permanently part of the body 530 of the probe supporter 500. In various embodiments, the counterweight can also be suitably attached to the body 530 probe supporter 500 (such a via welding, a fastener, snap fit, or clamp).

As indicated above, the distance between the contact surface of the probe 560 and the central axis of the probe supporter can vary depending on the desired distance of the fastener from the top edge of the workpiece. At any such distance, the nose positioner 200 is attached to the tool 100 such that the fastener path defined by the barrel 110 and at least the central axis of the rotational bearing 400 are aligned.

When the nose positioner 200 is attached to the barrel 110, the probe 560 extends from the barrel 110 in the direction of the central axis of the barrel 110 and is positioned so that part or all of the probe reaches beyond the front end of the tool 10.

The nose positioner 200 and its components can be made of materials that are generally corrosion resistant and durable. Some or all components can be made from materials such as but not limited to stainless steel, aluminum, plastic, or rubber.

In this illustrated example embodiment, the nose positioner 200 assists the operator of the tool 10 in the tool location process relative to the workpiece and for the fastener driving process. The nose positioner 200 assists in installing each fastener at a specific distance from a top edge of a workpiece (such as a board or panel). One example fastener driving process employing the example tool 10 is now described. To start a fastener driving process, the operator positions the tool 10 and specifically the nose positioner 200 based on a specific location that the operator wants the fastener to be driven. The nose positioner 200 including the probe 560 enables the operator to precisely position the tool 10 before depressing (or significantly depressing) the WCE 100. Specifically, the operator can rotate the tool 10 if needed relative to the workpiece to be in the best position for the operator. As the operator rotates the tool, the probe supporter 500 will automatically rotate due to gravity to cause the probe 560 to be in the uppermost position. The operator can then position the tool 10 such that the bottom contact surface of the probe 560 is on the top edge of the workpiece. At this point, the operator can also rotate the tool 10 if needed relative to the workpiece. When the position of the tool 10 and the nose positioner 200 is at the desired position, the operator can then depress the tool 10 to cause the WCE 100 to move to its fully retracted position. The operator can then pull the trigger of the trigger assembly 60 to actuate the trigger switch, which causes the piston and the attached driver blade to move from the pre-firing position to the firing position. This causes the driver blade to drive a fastener from the nosepiece assembly 40 through the barrel 110 into the workpiece and the underlying member. As this occurs, nose positioner 20 ensures the position of the tool 10 is at the desired position relative to the upper edge of the workpiece.

Figure 8:
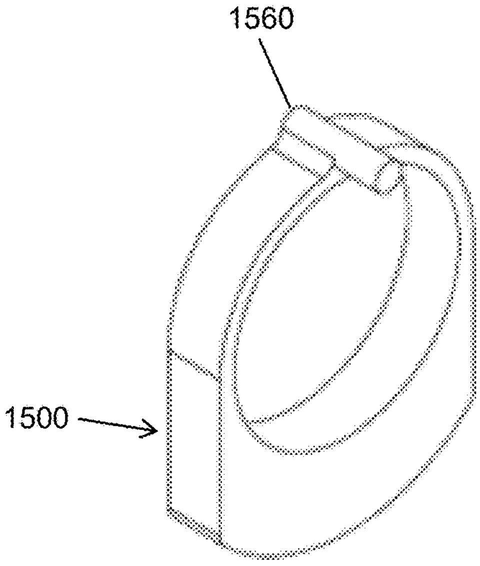
FIG. 8 is a front perspective view of a probe supporter and probe of a nose positioner in accordance with another example embodiment of the present disclosure.
Figure 9:
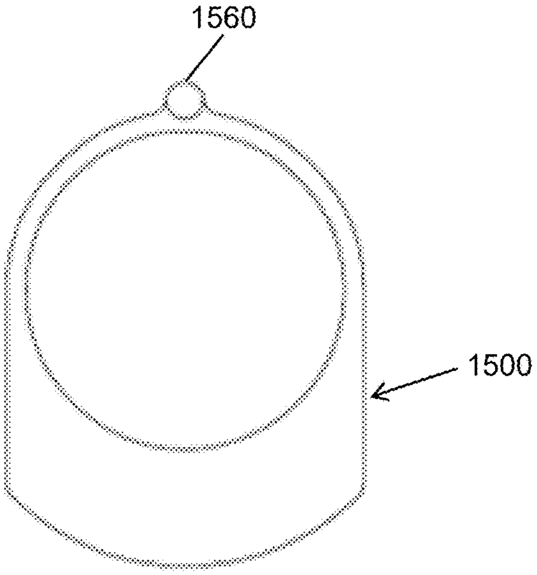
FIG. 9 is a rear view the probe supporter and probe of the nose positioner of FIG. 8.

FIGS. 8 and 9 illustrate a probe supporter 1500 nose positioner (not fully shown) of another example embodiment of the present disclosure. In this example, the probe 1560 is cylindrical and fixed (such as by welding) to the neck (not labeled) of the probe supporter 1500.

It should be appreciated from the above that various embodiments of the present disclosure thus provide a probe that assists in locating the fastener driving path a certain distance from an edge of the workpiece (such as a board edge), a counterweight that positions the probe in the desired orientation, and rotational component that enables motion for the probe and the counterweight to be oriented independent of the fastener driving tool. It should be appreciated that the counterweighting can be provided by other suitable mechanisms such as other counterweights. It should be appreciated that the rotational motion (by the rotational bearing) can be provided by other suitable mechanisms such as but not limited to a bushing, a sleeve, or a coating that creates a low friction interface. It should be appreciated that other suitable mechanisms for attachment to the tool can also be provided in accordance with the present disclosure.

Various modifications to the above-described embodiments will be apparent to those skilled in the art. These modifications can be made without departing from the spirit and scope of this present subject matter and without diminishing its intended advantages. Not all of the depicted components described in this disclosure may be required, and some implementations may include additional, different, or fewer components as compared to those described herein. Variations in the arrangement and type of the components; the shapes, sizes, and materials of the components; and the manners of attachment and connections of the components may be made without departing from the spirit or scope of the claims set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

The invention claimed is:

1. A fastener driving tool comprising a housing;

a nosepiece assembly connected to and supported by the housing, the nosepiece assembly including a workpiece contact element including a barrel; and a nose positioner including:

a barrel connector attached to the barrel, a rotational bearing connected to and supported by the barrel connector, a probe supporter connected to and supported by the rotational bearing, and a probe connected to and supported by the probe supporter, wherein the rotational bearing enables the probe supporter and the probe to rotate relative to the barrel connector and the barrel.

2. The fastener driving tool of claim 1, wherein the probe is removably connected to the probe supporter.

3. The fastener driving tool of claim 1, wherein the probe is fixedly connected to the probe supporter.

4. The fastener driving tool of claim 1, wherein the probe has a flat bottom contact surface configured to contact an upper edge of a workpiece.

5. The fastener driving tool of claim 1, wherein the probe includes a bottom contact surface spaced apart a fixed distance from a central axis of the probe supporter, wherein the fixed distance approximately equals a predetermined distance from a top edge of a workpiece.

6. The fastener driving tool of claim 1, wherein the rotational bearing includes a cylindrical outer member and a cylindrical inner member, wherein the outer member is connected to the probe supporter and the inner member is connected to the barrel connector.

7. The fastener driving tool of claim 1, wherein the probe supporter is configured to function as a counterweight such that the probe supporter and the probe are self positioning.

8. The fastener driving tool of claim 1, wherein the probe supporter includes an upper section and a lower section, wherein the upper section supports the probe and the lower section functions as a counterweight to position the probe.

9. The fastener driving tool of claim 1, wherein the probe supporter includes a lower section positioned radially opposite of the probe, wherein the lower section is of a sufficient mass such that it functions as a counterweight to the probe.

10. A fastener driving tool nose positioner comprising a barrel connector configured to be removably attached to a barrel of a workpiece contact element of a fastener driving tool;

a rotational bearing connected to and supported by the barrel connector;

a probe supporter connected to and supported by the rotational bearing; and a probe connected to and supported by the probe supporter, wherein the rotational bearing enables the probe supporter and the probe to rotate relative to the barrel connector.

11. The fastener driving tool nose positioner of claim 10, wherein the probe is removably connected to the probe supporter.

12. The fastener driving tool nose positioner of claim 10, wherein the probe is fixedly connected to the probe supporter.

13. The fastener driving tool nose positioner of claim 10, wherein the probe has a flat bottom contact surface configured to contact an upper edge of a workpiece.

14. The fastener driving tool nose positioner of claim 10, wherein the probe includes a bottom contact surface spaced apart a fixed distance from a central axis of the probe supporter, wherein the fixed distance approximately equals a predetermined distance from a top edge of a workpiece.

15. The fastener driving tool nose positioner of claim 10, wherein the rotational bearing includes a cylindrical outer member and a cylindrical inner member, wherein the outer member is connected to the probe supporter and the inner member is connected to the barrel connector.

16. The fastener driving tool nose positioner of claim 10, wherein the probe supporter is configured to function as a counterweight such that the probe supporter and the probe are self positioning.

17. The fastener driving tool nose positioner of claim 10, wherein the probe supporter includes an upper section and a lower section, wherein the upper section supports the probe and the lower section functions as a counterweight to position the probe.

18. The fastener driving tool nose positioner of claim 10, wherein the probe supporter includes a lower section positioned radially opposite of the probe, wherein the lower section is of a sufficient mass such that it functions as a counterweight to the probe.

* * * * *